(12) United States Patent  
Reigneau

(10) Patent No.: US 8,988,391 B2
(45) Date of Patent: Mar. 24, 2015

(54) OPTICAL NAVIGATION DEVICES

(75) Inventor: Mathieu Reigneau, Amilly (FR)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 625 days.

(21) Appl. No.: 13/053,520

(22) Filed: Mar. 22, 2011

(65) Prior Publication Data

US 2011/0234541 A1 Sep. 29, 2011

(30) Foreign Application Priority Data

Mar. 23, 2010 (GB) .................. 1004810.6

(51) Int. Cl.
G06F 3/042 (2006.01)
G06F 3/03 (2006.01)

(52) U.S. Cl.
CPC .............. G06F 3/042 (2013.01); G06F 3/0317 (2013.01); G06F 2203/04109 (2013.01)
USPC ...................................................... 345/175

(58) Field of Classification Search
CPC ....................................................... G06F 3/042
USPC ........................................................ 345/175
See application file for complete search history.

(56) References Cited

U.S. PATENT DOCUMENTS 6,061,177 A * 5/2000 Fujimoto ....................... 359/443
2001/0038381 A1* 11/2001 Griencewic .................... 345/163
2002/0125119 A1* 9/2002 Cole et al. ..................... 200/341
2004/0119668 A1* 6/2004 Homma et al. ................. 345/82
2004/0164953 A1* 8/2004 Keranen et al. ............... 345/156
2005/0264537 A1 12/2005 Yang .............................. 345/173
2006/0227120 A1 10/2006 Eikman
2006/0256086 A1* 11/2006 Xie et al. ....................... 345/166
2007/0152977 A1 7/2007 Ng et al. ....................... 345/173
2008/0029691 A1 2/2008 Han
2009/0128508 A1 5/2009 Sohn et al.
2009/0160769 A1* 6/2009 Lowles et al. ................. 345/160
2010/0123675 A1* 5/2010 Ippel ............................. 345/173
2010/0302160 A1* 12/2010 Reigneau ...................... 345/166
2011/0122061 A1* 5/2011 Stenmark et al. ............. 345/157
2011/0122092 A1* 5/2011 Lu ................................ 345/175
2011/0205154 A1* 8/2011 Lowles et al. ................. 345/157
2011/0205179 A1* 8/2011 Braun ........................... 345/174
2011/0291924 A1* 12/2011 Raynor ......................... 345/157

FOREIGN PATENT DOCUMENTS

EP 000860755 A1 * 8/1998 ............ G04B 19/30
JP 2007-226439 9/2007

* cited by examiner

Primary Examiner — Claire X Pappas
Assistant Examiner — Robert Stone
(74) Attorney, Agent, or Firm — Allen, Dyer, Doppelt, Milbrath & Gilchrist, P.A.

(57) ABSTRACT

An imaging device may have an imaging surface and a sensor. The imaging surface may be illuminated by a first source and reflect at least some of the illumination to the sensor to detect an image. The imaging device may have a predetermined width and an optical path passing therethrough. The imaging device may be illuminated by a second source, and the illumination of the second source may be directed to one or more predetermined regions on or near the imaging surface to produce an optical effect associated with the imaging surface.

30 Claims, 5 Drawing Sheets

CROSS SECTION A-A'

CROSS SECTION A-A'

CROSS SECTION B-B'

CROSS SECTION C-C'

OPTICAL NAVIGATION DEVICES

FIELD OF THE INVENTION

The present disclosure relates to improvements in or relating to optical navigation devices.

BACKGROUND OF THE INVENTION

Computer devices are becoming ever smaller, and full computing functionality can be found on phones and smart phones and other personal digital assistants (PDA). As computer devices become smaller, the various features of the computer devices may also become smaller. This may include smaller input systems for the user to enter data into the device. One such input system is an optical navigation device. Many computer devices, large and small, are equipped with optical navigation devices. However, with the smaller computer devices, minimizing the size of the optical navigation device can often be restrictive and problematic.

A number of devices have been disclosed that offer thin thickness optical navigation devices. These have had some success, but the designs have generally not addresses some problems associated with thin imaging devices. One problem which may remain is providing custom shaped illumination on optical devices, such as a finger-mouse without having to resort to expensive or bulky options. Custom shaped illumination includes aesthetic and optical effects on the surface of the mouse which can have different uses. Previously, lightpipes have been disclosed as a way of custom shaping illumination. However, such lightpipes may require a lot of space, typically several millimeters, which would not be suitable for thin optical devices.

SUMMARY OF THE INVENTION

It is an object of the present disclosure to provide an approach to at least some of the problems associated with the prior art. It is a further object of the present disclosure to provide an optical navigation device having custom shaped illumination which does not add bulk or excessive cost to the manufacture of the optical navigation device.

According to one aspect of the present disclosure, an imaging device may include an imaging surface and a sensor. The imaging surface may be illuminated by a first source and reflect at least some of the illumination to the sensor to detect an image. The imaging device may have a predetermined width and an optical path passing therethrough. The imaging device may be illuminated by a second source, and the illumination of the second source may be directed to one or more predetermined regions on or near the imaging surface to produce an optical effect associated with the imaging surface.

The present embodiments may offer a number of benefits. The present embodiments may provide a predetermined region on the surface of the element which can be used to show optical and aesthetic effects. These effects can be design related or of practical use. The effects may be brought about by forming an optical element in a particular manner. The form may ensure that the device remains thin and does not cost much to implement.

BRIEF DESCRIPTION OF THE DRAWINGS

Reference may now be made, by way of example, to the accompanying drawings, in which:

FIG. 1b is a view of the top surface of the device of FIG. 1a;

FIG. 4b is a top view of the device of FIG. 4a;

FIG. 5b is a top view of the device of FIG. 5a;

FIG. 6b is a top view of the device of FIG. 6a.

DETAILED DESCRIPTION OF THE PREFERRED EMBODIMENTS

The present embodiments relate to an imaging device associated with an optical navigation device. The optical navigation device is a mouse of small-scale which is intended to be operated by way of frustrated total internal reflection (F-TIR) in order to recognize the movement of a finger on an imaging surface. This type of mouse is herein referred to as a finger-mouse.

Figure 1A:
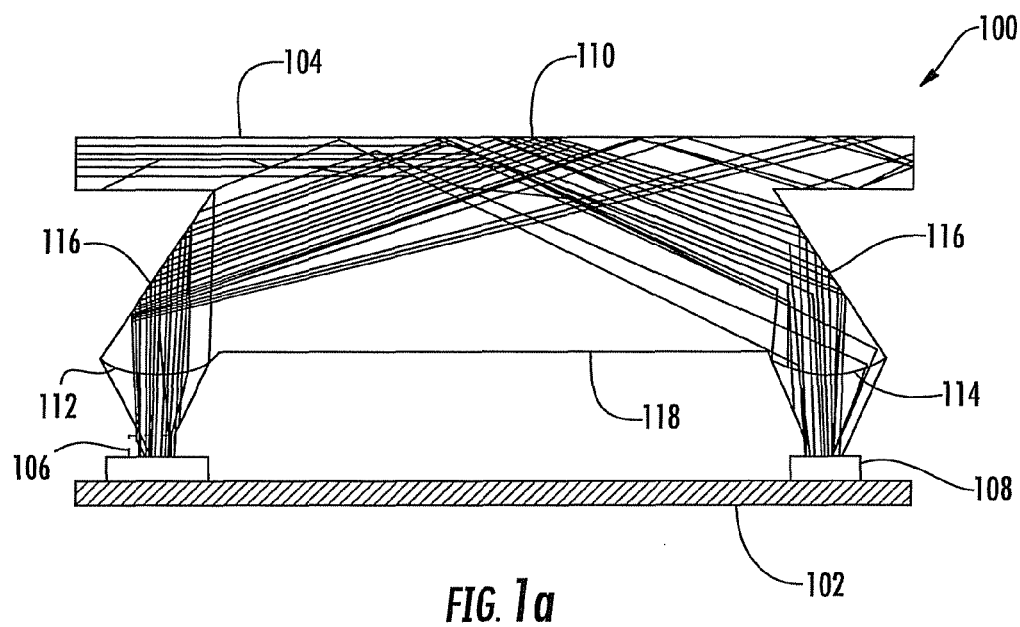
FIG. 1a is a cross-sectional diagram of an imaging device for an optical navigation device, according to the prior art.
Figure 1B:
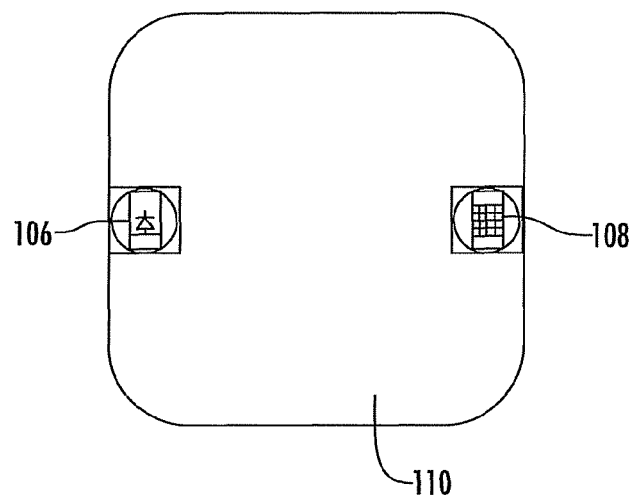

FIG. 1a shows an example of a fingermouse 100 in accordance with the prior art. The fingermouse includes a base 102, an imaging element shown generally at 104, an LED 106, and a sensor 108. The top surface 110 of the imaging element 104 is a frustrated total internal reflection (F-TIR) surface. In addition, the imaging element includes a collimating lens 112 between the LED and the imaging element and an imaging lens 114 between the imaging element and the sensor. The imaging element further includes two total internal reflection mirror elements 116 which direct illumination from the collimating lens to the frustrated total internal reflection surface and then from the frustrated total internal reflection surface to the imaging lens. The lower surface 118 of the imaging element is substantially flat. FIG. 1b shows the frustrated total internal reflection surface 110 with the LED 106 and the sensor 108 there below as viewed from above.

The present embodiments provide custom shaped illumination, such as a ring, other shape or perimeter, to an optical device, such as a fingermouse. This is achieved by using a single light source, such as an LED and changing the shape of the imaging element. This enables the light source to be collimated onto an edge of the imaging element. The custom shaped illumination can be used to brighten the fingermouse and give rise to a number of aesthetic or optical effects. These effects can include showing logos, colors or moods on the mouse which are in tune with the phone or camera design, etc. Other uses include improved backlighting and illumination making the mouse easier to use in bad lighting conditions.

Figure 2:
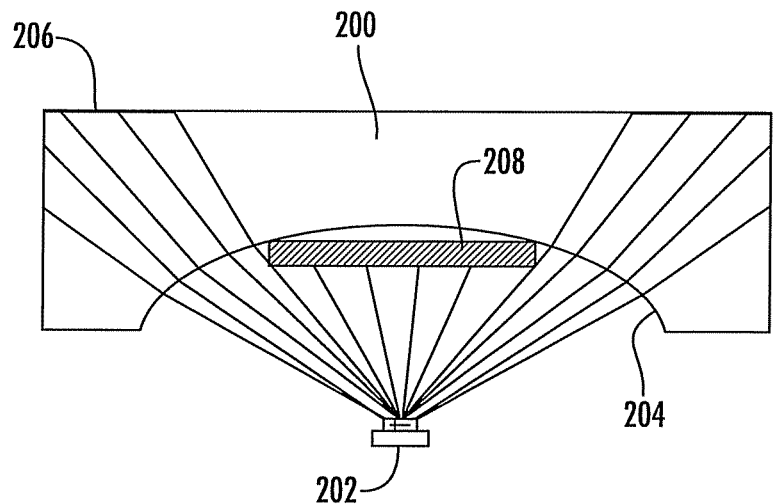
FIG. 2 is a cross-sectional view of one imaging element for an optical navigation device, according to the present disclosure.

Referring to FIG. 2, the imaging element 200 of an optical device in accordance with a present embodiment is shown. The imaging element 200 is illuminated by LED 202. The imaging element includes a curved surface 204, which is shaped in a predetermined manner, to ensure that illumination from the light source may be directed to certain areas of the top surface of the imaging element. The areas on the top surface are roughened areas 206 which scatter illumination from the source. The roughened surface is rough to the touch and can be any appropriate shape or size although in a preferred embodiment the roughened surface forms a circular ring or a square perimeter around the edge of the imaging element.

A mask 208 is positioned to prevent illumination from the light source heading directly to the top surface of the imaging element. The mask can be replaced by an appropriate coating on the curved surface 204. In an alternative embodiment, the curved surface may be roughened so that additional backlighting is provided by the LED 202 at the top surface of the imaging element. In yet another embodiment, the mask can incorporate a number of holes, forming a pattern, and coupled to a roughened curved surface to thereby produce a logo display on the top surface of the optical element when the mask is illuminated by the LED 202.

Figure 3:
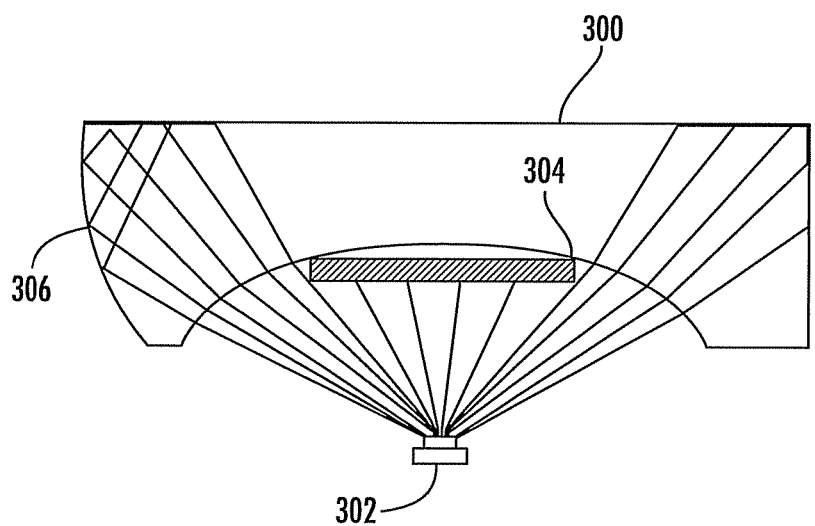
FIG. 3 is a cross-sectional view of another embodiment of an imaging element for an optical navigation device, according to the present disclosure.

FIG. 3 shows a further embodiment of an optical element 300. The optical element 300 is illuminated by light source 302 and includes a mask 304. The various aspects of the light source and mask are equivalent to the earlier embodiment. The imaging element 300 includes a total internal reflection surface 306 which ensures that more light is directed to the roughened surface than in the FIG. 2 embodiment. The FIG. 3 embodiment includes one internal reflection surface 306 but it may be appreciated that a further surface can be provided on the opposite side.

The optical element (200 or 300) can be made from any transparent material. However, due to the complexity of the various surfaces and shapes thereof, a moldable material is preferred. Possible materials include polycarbonate and acrylics, such as poly (methyl methacrylate) PMMA, Lexan 121R, Makrolon 2405, glass, Polyethylene, PVB (Polyvinyl butyral) or any other appropriate material.

Figure 4A:
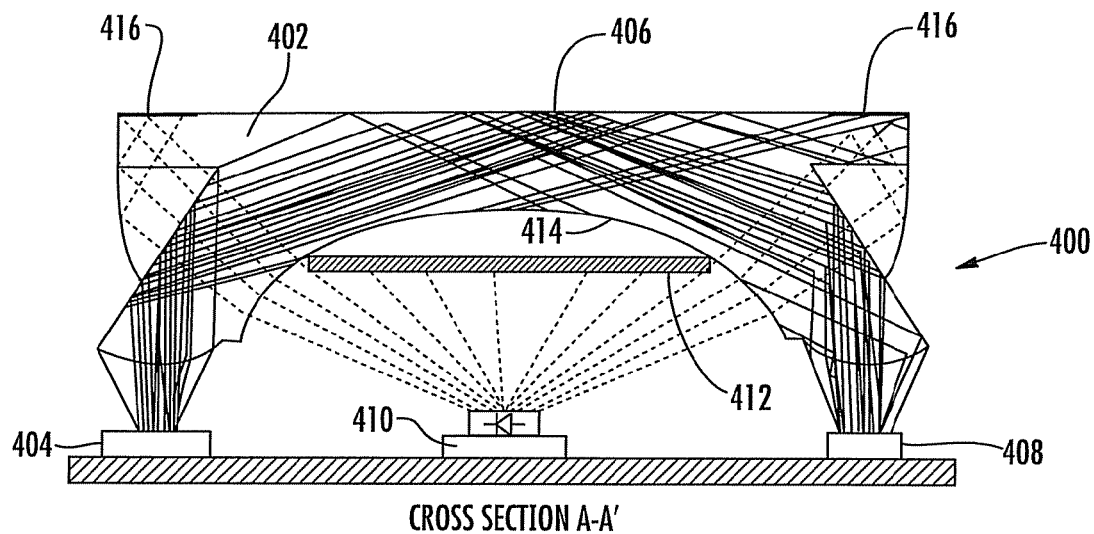
FIG. 4a is a cross-sectional diagram of an imaging device for an optical navigation device, according to the present disclosure.

Referring to FIG. 4a an optical imaging device is shown generally at 400. The optical imaging device includes an optical element 402, which may be shaped as previously described, or in any other appropriate shape. The device also includes a first light source 404, the illumination of which is focused onto a mousing surface 406 on the top surface of optical element 402. The mousing surface 406 responds to movement of a finger or other appropriate pointing device on the surface to set up the F-TIR of the illumination, which is detected by the sensor 408. The F-TIR surface can reflect, absorb or scatter the illumination. The optical devices include a second light source 410 and a mask 412. The mask can be replaced by a coating on the curved surface 414 of the optical element 402 or by other appropriate methods as earlier described. The illumination from the second light source is blocked from the mousing surface 406 by way of the mask. Any illumination that is not blocked by the mask is directed to roughened surfaces 416 around the edge of the optical element 402 by way of the shape and configuration of the optical element.

Figure 4B:
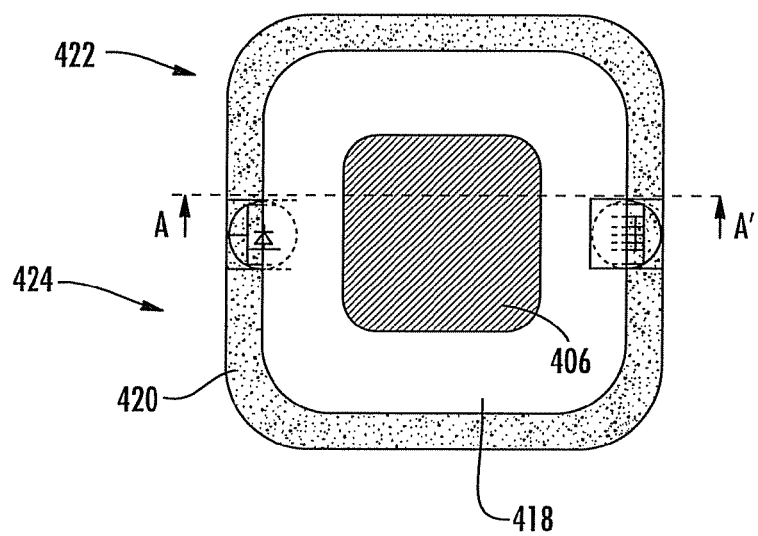

As can be seen in FIG. 4b, the mousing surface 406 shows a reflection of the mask 418 and a ring 420 defining the roughened surface. The ring 420 comprises an upper ring 422 and a lower half ring 424. The ring is shown as straight sided with curved corners but could be any other shape including fully circular or any other straight edged form or perimeter depending on the optical element shape and any user requirements. The brightness of the ring 418 may depend upon the configuration of the optics of the fingermouse and could be dark or similar to the half rings depending on the shape, nature and orientation of the optical elements.

Figure 5A:
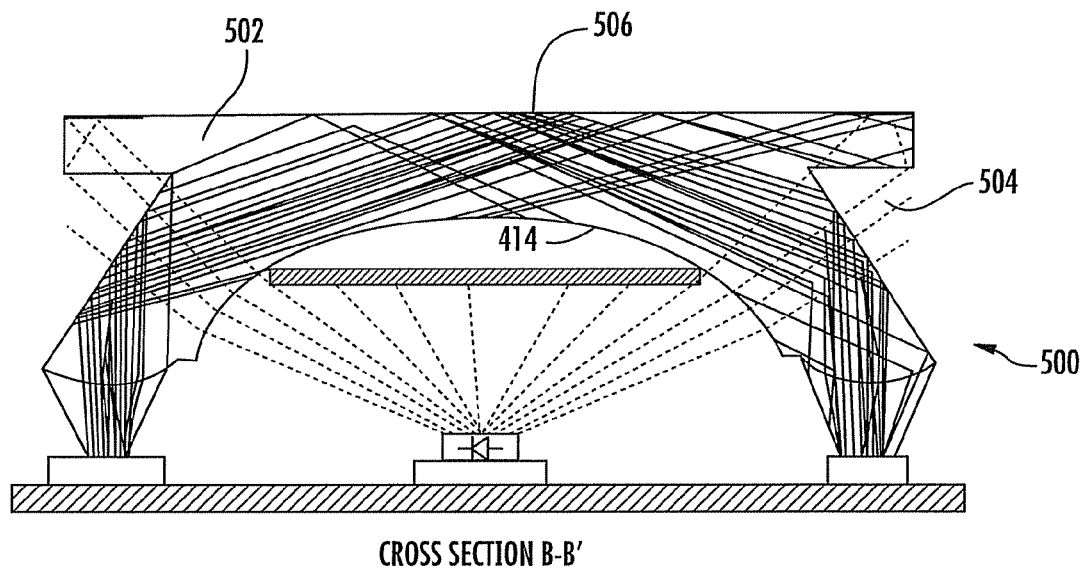
FIG. 5a is a cross-sectional diagram of an imaging device for an optical navigation device, according to the present disclosure.

Referring to FIG. 5a a further embodiment of an optical device 500 is shown. The majority of the elements in the second embodiment are equivalent to those in the first embodiment of FIG. 4 and may not be described in further detail. In the present embodiment, the optical element 502 is formed in a different manner having a gap 504 between the upper surface of the optical element and the input and output end of the optical element for the purposes of illuminating the mousing surface 506. This gap provides a surface which refracts backlight to the roughened surface and changes the appearance of the mouse.

It is possible to include more than one second source of illumination, for example, two or more different colored LEDs. These can be separated from one another by an appropriate barrier. The result is a multicolored surface having different regions of the roughened surface being of different colors.

Figure 5B:
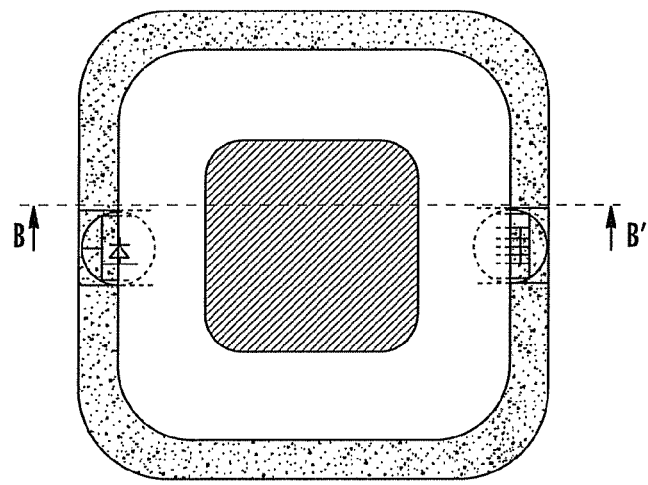
Figure 6A:
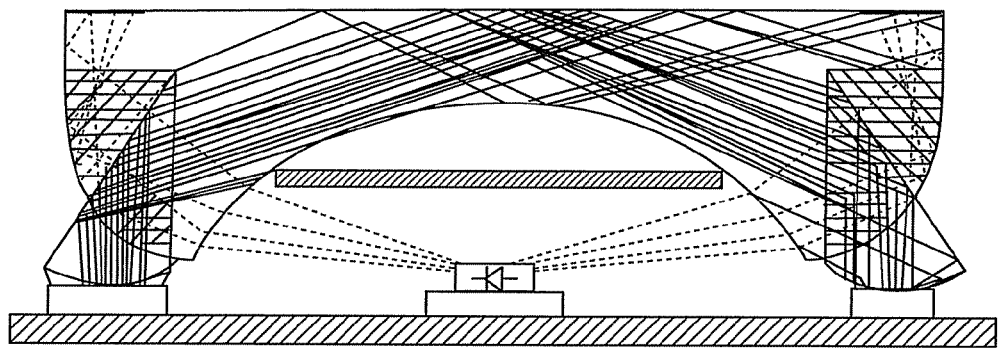
FIG. 6a is a cross-sectional diagram of an imaging device for an optical navigation device, according to the present disclosure.
Figure 6B:
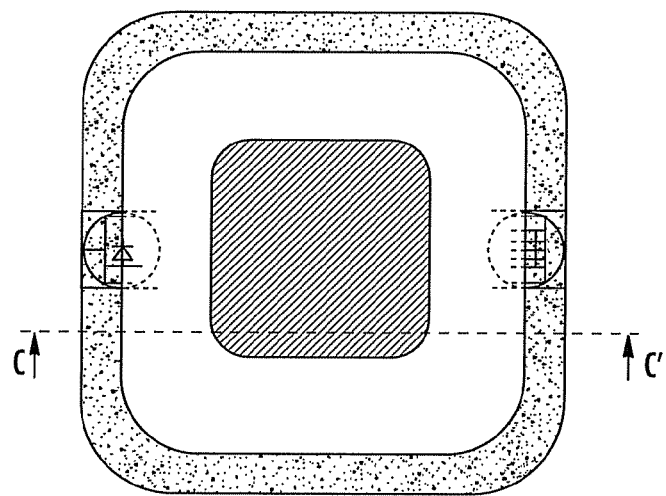

In an alternative embodiment, the single LED in the center may be changed for a combination of the several LEDs of different colors to allow for dynamic color change of the ring illumination. The orientation of the LED in the embodiment shown in FIGS. 4 and 5 has the illumination being directed generally upwards. An alternative arrangement as shown in FIG. 6a provides a side emitting LED instead of the standard LED. This allows a greater degree of illumination to be collimated onto the ring surface, and the LED can be closer to the optical element, thereby reducing the size of the optical device. In the side emitting light LED embodiment, the optical element is formed accordingly to ensure the illumination travels in the desired manner.

The optical element may be of any form shape or size and adaptation may be made to accommodate different orientations of LED and other elements within the device. A potential requirement is that there are essentially two illumination sources: one from the first LED to illuminate a mousing surface and a second that enables illumination of a ring or other shape on the upper surface of the optical element. The examples presented here in have shown entire rings around the edge of the optical elements; however, it would be appreciated that gaps may occur by positioning of certain masking elements to give different patterns. In the diagrams, the illumination for mouse action is shown by a solid line and the illumination for custom shaped ring illumination is shown by a dotted line.

The distance between the mousing surface and under the first LED or sensor in the present embodiment is in the region of 2.5 mm. This distance is the thickness of the imaging device and can vary between 2 mm and 3 mm. Ideally, the thickness is not generally greater than 5 mm. The imaging device can be formed from a single piece molding. The molding includes each of the individual optical elements shown in the diagrams. The imaging device could alternatively be made in other appropriate ways with different optical elements, which produce the same optical effect. The imaging device may also be made from a number of different elements, rather than a single molding. The technique for forming the imaging device may include techniques other than molding, such as replication, stamping, embossing or machining.

The sensor is of any appropriate type and may be a CMOS sensor having an array of pixels for measuring reflected light at different locations to produce an image. The illumination sources are, for example, LEDs which may be of any appropriate type and may generate a source in the "optical" or non-optical ranges. Accordingly, reference to optics and optical are intended to cover wavelengths which are not in the human visible range. The optics, which takes the illumination from the source to the imaging surface, may be of any appropriate type.

The imaging device is intended for use in an optical navigation device; however, it may be appreciated that the imaging device could be used in any appropriate device, for example, fingerprint reader or Lab-on-chip/Bio-Optical sensor systems (which detect chemi-fluorescence for medical and/or bio-testing applications). The optical navigation device may be used in any suitable devices such as a mobile or smart telephone, other personal or communications devices, a computer, a remote controller, access modules for doors and the like, a camera or any other suitable device. There are many variations of the present embodiments which may be appreciated by the person skilled in the art and which are included within the scope of the present invention.

That which is claimed:

1. An imaging device comprising:
   an optical element having an imaging surface and at least one region adjacent said imaging surface;
   a first light source configured to transmit radiation over a first optical path to illuminate said imaging surface;
   a sensor configured to detect reflected illumination from said imaging surface to detect an image; and
   a second light source configured to transmit radiation over a second optical path to illuminate said at least one region to produce an optical effect associated with said imaging surface, the illumination from said second light source being at least partially transmitted by said at least one region;
   said first and second optical paths crossing in said optical element.

2. The imaging device of claim 1 wherein said optical element defines an optical path therethrough and between said first light source and said sensor.

3. The imaging device of claim 1 wherein the illumination from said first source is reflected, absorbed, and scattered by movement of a pointer object moving relative to said imaging surface.

4. The imaging device of claim 1 wherein said optical element further includes a curved surface opposite said imaging surface; and wherein said curved surface is configured to collimate the illumination from said second light source onto said at least one region.

5. The imaging device of claim 4 further comprising a coating layer on said curved surface to prevent said second light source from illuminating said imaging surface.

6. The imaging device of claim 1 further comprising a mask plate configured to prevent said second light source from illuminating said imaging surface.

7. The imaging device of claim 1 wherein said at least one region defines a perimeter around said imaging surface.

8. The imaging device of claim 1 wherein said at least one region has a rough surface.

9. The imaging device of claim 1 wherein said optical element comprises an integral optical element.

10. The imaging device of claim 1 wherein said optical element comprises a molded optical element.

11. An electronic device comprising:
    an imaging device comprising
       an optical element having an imaging surface and at least one region adjacent said imaging surface,
       a first light source configured to transmit radiation over a first optical path to illuminate said imaging surface,
       a sensor configured to detect reflected illumination from said imaging surface to detect an image, and
       a second light source configured to transmit radiation over a second optical path to illuminate said at least one region to produce an optical effect associated with said imaging surface, the illumination from said second light source being at least partially transmitted by said at least one region,
       said first and second optical paths crossing in said optical element.

12. The electronic device of claim 11 wherein said optical element defines an optical path therethrough and between said first light source and said sensor.

13. The electronic device of claim 11 wherein the illumination from said first source is reflected, absorbed, and scattered by movement of a pointer object moving relative to said imaging surface.

14. The electronic device of claim 11 wherein said optical element further includes a curved surface opposite said imaging surface; and wherein said curved surface is configured to collimate the illumination from said second light source onto said at least one region.

15. The electronic device of claim 14 wherein said imaging device further comprises a coating layer on said curved surface to prevent said second light source from illuminating said imaging surface.

16. The electronic device of claim 11 wherein said imaging device further comprises a mask plate configured to prevent said second light source from illuminating said imaging surface.

17. The electronic device of claim 11 wherein said imaging device defines an optical navigation device.

18. The electronic device of claim 11 further comprising a personal computer device cooperating with said imaging device.

19. The electronic device of claim 11 further comprising a phone device cooperating with said imaging device.

20. The electronic device of claim 11 further comprising a camera device cooperating with said imaging device.

21. The electronic device of claim 11 further comprising a remote controller device cooperating with said imaging device.

22. A method of making an imaging device comprising:
    forming an optical element having an imaging surface and at least one region adjacent the imaging surface;
    positioning a first light source to transmit radiation over a first optical path to illuminate the imaging surface;
    positioning a sensor to detect reflected illumination from the imaging surface to detect an image; and
    positioning a second light source to transmit radiation over a second optical path to illuminate the at least one region to produce an optical effect associated with the imaging surface, the illumination from the second light source being at least partially transmitted by the at least one region, the first and second optical paths crossing in the optical element.

23. The method of claim 22 further comprising forming an optical path through the optical element and between the first light source and the sensor.

24. The method of claim 22 wherein the illumination from the first source is reflected, absorbed, and scattered by movement of a pointer object moving relative to the imaging surface.

25. The method of claim 22 further comprising forming the optical element to further include a curved surface opposite the imaging surface, the curved surface collimating the illumination from the second light source onto the at least one region.

26. The method of claim 25 further comprising forming a coating layer on the curved surface to prevent the second light source from illuminating the imaging surface.

27. The method of claim 22 further comprising positioning a mask plate to prevent the second light source from illuminating the imaging surface.

28. An imaging device comprising:
an optical element having an imaging surface, a curved surface opposite said imaging surface, and at least one region adjacent said imaging surface;
a first light source configured to illuminate said imaging surface;
a sensor configured to detect reflected illumination from said imaging surface to detect an image; and
a second light source configured to illuminate said at least one region to produce an optical effect associated with said imaging surface;
said curved surface of said optical element configured to collimate the illumination from said second light source onto said at least one region.

29. An electronic device comprising:
an imaging device comprising
an optical element having an imaging surface, a curved surface opposite said imaging surface, and at least one region adjacent said imaging surface,
a first light source configured to illuminate said imaging surface,
a sensor configured to detect reflected illumination from said imaging surface to detect an image, and
a second light source configured to illuminate said at least one region to produce an optical effect associated with said imaging surface,
said curved surface of said optical element configured to collimate the illumination from said second light source onto said at least one region.

30. A method of making an imaging device comprising:
forming an optical element having an imaging surface, a curved surface opposite the imaging surface, and at least one region adjacent the imaging surface;
positioning a first light source to illuminate the imaging surface;
positioning a sensor to detect reflected illumination from the imaging surface to detect an image; and
positioning a second light source to illuminate the at least one region to produce an optical effect associated with the imaging surface, the curved surface of the optical element collimating the illumination from the second light source onto the at least one region.

\* \* \* \* \*